United States Patent
Mattsson et al.

(10) Patent No.: US 10,871,590 B2
(45) Date of Patent: Dec. 22, 2020

(54) ELECTROMAGNETIC DATA INVERSION

(71) Applicant: PGS Geophysical AS, Oslo (NO)

(72) Inventors: Johan Mattsson, Houston, TX (US); Carl Joel Gustav Skogman, Houston, TX (US); Leif Abrahamsson, Houston, TX (US); Jenny-Ann Malmberg, Oslo (NO); Tryggve Sørensen, Oslo (NO)

(73) Assignee: PGS Geophysical AS, Oslo (NO)

( * ) Notice: Subject to any disclaimer, the term of this patent is extended or adjusted under 35 U.S.C. 154(b) by 313 days.

(21) Appl. No.: 16/009,305

(22) Filed: Jun. 15, 2018

(65) Prior Publication Data

US 2018/0364390 A1    Dec. 20, 2018

Related U.S. Application Data

(60) Provisional application No. 62/521,003, filed on Jun. 16, 2017.

(51) Int. Cl.
| | |
|---|---|
| *G01V 3/38* | (2006.01) |
| *G01V 3/15* | (2006.01) |
| *G01V 3/02* | (2006.01) |
| *G01V 3/08* | (2006.01) |

(52) U.S. Cl.
CPC .............. *G01V 3/38* (2013.01); *G01V 3/02* (2013.01); *G01V 3/083* (2013.01); *G01V 3/15* (2013.01)

(58) Field of Classification Search
CPC . G01V 3/38; G01V 3/083; G01V 3/15; G01V 3/02
See application file for complete search history.

(56) References Cited

U.S. PATENT DOCUMENTS

| | | | |
|---|---|---|---|
| 8,095,345 B2 * | 1/2012 | Hoversten | G01V 11/00 703/2 |
| 8,126,650 B2 * | 2/2012 | Lu | G01V 3/083 702/11 |
| 8,239,181 B2 * | 8/2012 | Lu | G01V 3/12 703/10 |

(Continued)

OTHER PUBLICATIONS

McKay et al., "Towed Streamer EM: Reliable recovery of subsurface resistivity"; First Break (Special Topic): EM & Potential Methods, vol. 33 (Apr. 2015) (11 pgs).

(Continued)

*Primary Examiner* — Mohammad K Islam

(57) ABSTRACT

Electromagnetic (EM) inversion includes determining an electric field associated with EM data within a predetermined sensitivity area around each of a plurality of source positions, iteratively inverting the electric field for a subsurface resistivity EM model indicative of a subterranean formation for each of a plurality of EM electrical resistivity data cells within each of the predetermined sensitivity areas, and storing results of the iterative inversion. A linear system of equations comprising a Jacobian matrix is generated based on the iterative inversion, the linear system of equations is stored, and the linear system of equations is solved at each iteration of the iterative inversion to update the subsurface resistivity EM model until a convergence criterion is met. A resistivity map based on the updated subsurface resistivity EM model can be produced.

19 Claims, 4 Drawing Sheets

(56) References Cited

U.S. PATENT DOCUMENTS

| | | | | |
|---|---|---|---|---|
| 2002/0040274 | A1* | 4/2002 | Yin | G01V 3/38 |
| | | | | 702/7 |
| 2009/0083006 | A1* | 3/2009 | Mackie | G01V 11/00 |
| | | | | 703/1 |
| 2009/0204327 | A1* | 8/2009 | Lu | G01V 3/12 |
| | | | | 702/7 |
| 2010/0018719 | A1* | 1/2010 | Lu | G01V 3/12 |
| | | | | 166/369 |
| 2012/0163727 | A1* | 6/2012 | Jeon | G06T 11/006 |
| | | | | 382/254 |
| 2013/0173163 | A1 | 7/2013 | Zhandov et al. | |
| 2017/0075030 | A1* | 3/2017 | Wheelock | G01V 11/00 |
| 2018/0136349 | A1* | 5/2018 | Wiik | G01V 99/005 |

OTHER PUBLICATIONS

Zhdanov, et al., "Advanced 3D imaging of complex geo-electrical structures using towed streamer EM data over the Mariner field in the North Sea"; First Break (Special Topic): Marine Seismic, vol. 33 (Nov. 2015) (5 pgs).

Nguyen, et al., "Comparing large-scale 3D Gauss-Newton and BFGS CSEM inversions"; SEG 2016.

Key, et al., "Anisotropic 2.5D inversion of towed streamer EM data from three North Sea fields using parallel adaptive finite elements"; 76th EAGE Conference & Exhibition 2014 (Jun. 16-19, 2014) (5 pgs).

Krylstedt, et al., "A computer program for inverse electromagnetic wave propagation in horizontally stratified dispersive environments"; SE Jun. 2000.

Zhdanov, et al., "Anisotropic 3D inversion of towed streamer EM data: Case study from the Troll West Oil Province"; Special Section: Interpretation and Integration of CSEM Data, vol. 2, No. 3 (Aug. 2014) (18 pgs).

Abubakar, et al., "2.5D forward and inverse modeling for interpreting low-frequency electromagnetic measurements"; Geophysics, vol. 73, No. 4 (Jul.-Aug. 2008).

Chevalier, et al., "PT-Scotch: A tool for efficient parallel graph ordering: Parallel Computing"; vol. 34, No. 6-8 (pp. 318-331) http://dx.doi.org/10.1016/j.parco.2007.12.001.

* cited by examiner

ELECTROMAGNETIC DATA INVERSION

CROSS-REFERENCE TO RELATED APPLICATIONS

This application claims priority to U.S. Provisional Application 62/521,003, filed Jun. 16, 2017, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed for hydrocarbon-charged reservoirs. Marine survey receivers (hereinafter referred to as "receivers") may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be impulsive sources such as air guns, non-impulsive sources such as marine vibrator sources, electromagnetic (EM) sources, etc., to produce signals at selected times. Each signal is essentially a pressure wave from seismic sources and a diffusive electric current field from EM sources that travels down through the water and into the subterranean formation. For EM sources, the electric current injected into the water travels into the subsurface according to diffusion physics that govern the Controlled Source ElectroMagnetic (CSEM) method. The resulting EM field in the water is measured by the receivers. The resulting EM field can be indicative of mineral deposits.

DETAILED DESCRIPTION

Figure 1:
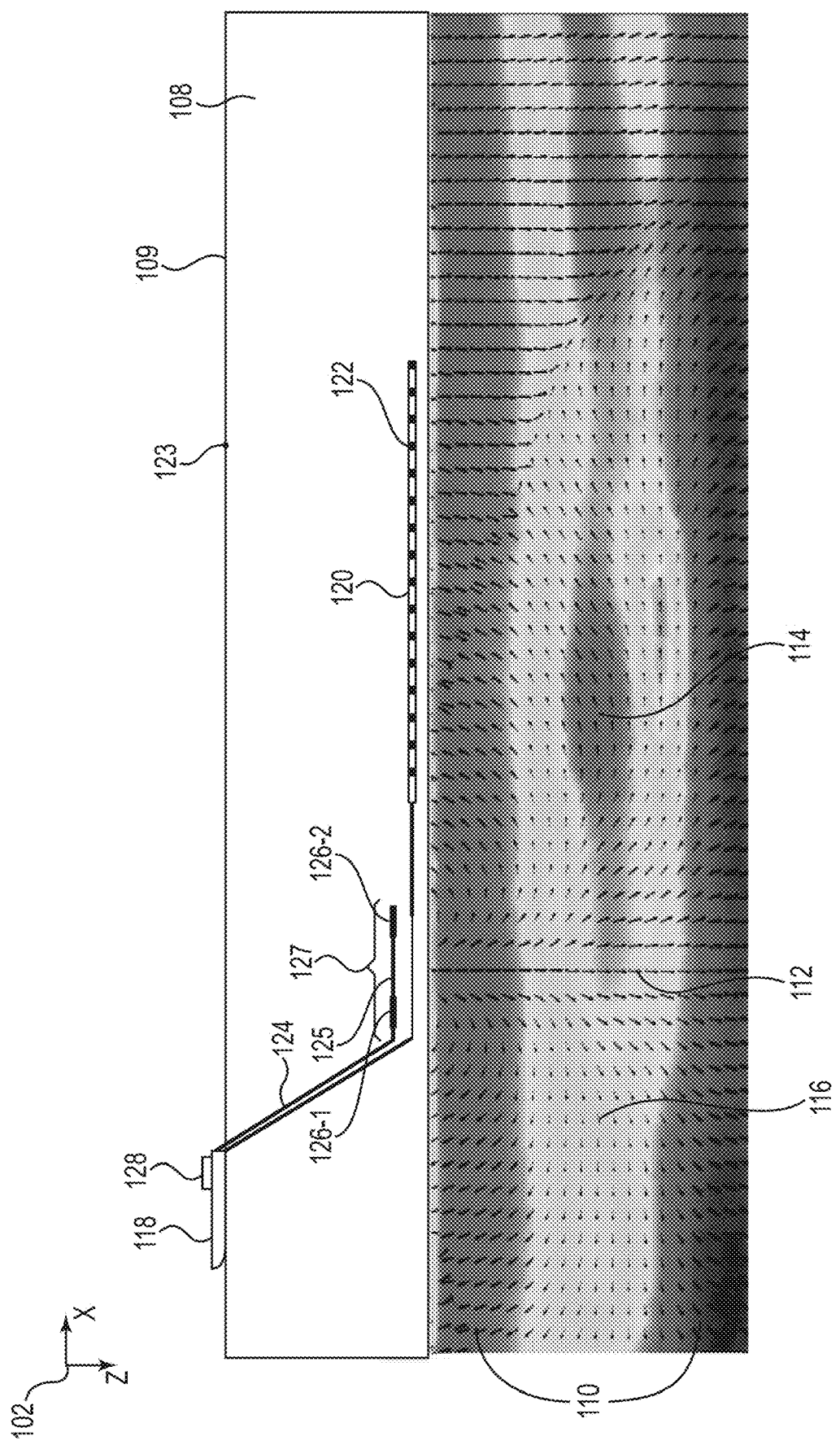
FIG. 1 illustrates an xz-plane view of controlled source electromagnetic (CSEM) surveying in which an electric current is injected into a water volume by a CSEM source according to an embodiment.

The present disclosure is related to EM data inversion. EM data inversion includes the process of transforming EM data into a quantitative property description of a reservoir, such as a subterranean formation, rock property description, or seafloor resistivity. As the size of EM data acquisition areas increases, so does the amount of EM data acquired and inverted. For instance, CSEM acquisition areas have increased in size from hundreds of square or cubed kilometers (km) to millions of square or cubed km. EM data, as used herein, is data acquired during an EM survey. CSEM data, as used herein, is data acquired during a CSEM survey. A CSEM survey includes the use of EM remote-sensing technology to indicate the presence and extent of hydrocarbon below a seafloor. A CSEM survey employs a source towed above the seafloor to transmit a time-varying EM field into the earth. The time-varying EM field is modified by the presence of subsurface resistive layers, and the modifications are detected at a marine EM receiver.

Prior approaches to EM data inversion include the use of a regularized conjugate gradient algorithm for inversion of towed streamer EM data or a Gauss-Newton algorithm for inversion of towed streamer EM data. However, such approaches may not handle large-scale inversions of EM data because of the amount of computation and memory resources the large-scale inversions demand. As used herein, a large-scale inversion includes inversions having unknowns above a particular threshold, for instance above one million unknowns. The aforementioned algorithms may demand a terabyte or more of memory to handle a large-scale inversion. Such a memory demand may not be available on a node, or the large-scale inversion may take an undesirable amount of time to perform using the aforementioned algorithms. As used herein, a node includes a connection point that can receive, create, store, or send data. Example nodes include computing devices and processing resources, among others.

At least one embodiment of the present disclosure includes generating a Jacobian matrix associated with acquired EM data and distributing computations associated with the EM data of the Jacobian matrix over a plurality of nodes, such that memory demand on each of the plurality of nodes is reduced. Similarly, computational time on each of the plurality of nodes is reduced. This, in turn improves performance of the plurality of nodes. The Jacobian matrix, in at least one embodiment, can be part of a linear system of equations that is resultant of inverted electric fields associate with the EM data. For instance, the electric fields are iteratively inverted, for example, at each of the plurality of nodes using a conjugate gradient algorithm or a Gauss-Newton algorithm, and upon completion of the inversions, resulting EM data is combined to create a resistivity model indicative of a seafloor or subterranean formation associated with the acquired EM data. In at least one embodiment, examples are used to validate third party three-dimensional inversion results.

Put another way, memory demand on each node is reduced by distributing a linear system of equations across the plurality of nodes. By doing so, communication demand between nodes is reduced, allowing for the use of the plurality of nodes. In at least one embodiment, some communication exists between the plurality of nodes, and as a result, an inversion is performed over the plurality of nodes as a whole, as discussed further herein. For instance, examples of the present disclosure solves a technical problem of EM data inversion of large amounts of data with a limited number of nodes, computational ability, or time.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 220 in FIG. 2. Analogous elements within a Figure may be referenced with a hyphen and extra numeral or letter. See, for example, elements 235-1, . . . , 235-n in FIG. 2. Such analogous elements may be generally referenced without the hyphen and extra numeral or letter. For example, elements 235-1, . . . , 235-n may be collectively referenced as 235. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an xz-plane 102 view of CSEM surveying in which an electric current is injected into a water volume 108 by CSEM source 127 according to an embodiment. The CSEM source 127 can include a forward electrode 126-1 coupled to an aft electrode 126-2 via an interconnect cable 125. The forward electrode 126-1 can assume a relatively fixed layback (depth and distance) with respect to the marine survey vessel 118 and the aft electrode 126-2 can be maintained at a relatively fixed distance behind the forward electrode 126-1 because of drag forces from being towed. The forward electrode 126-1 can be coupled to the marine survey vessel 118 via a cable 124. The depth of the forward electrode 126-1 can be set by a deployed length of the cable 124. The interconnect cable 125 can cause changes in the depth or lateral position of the forward electrode 126-1 to be transmitted to the aft electrode 126-2. The CSEM source 127 can include one or more CSEM sources. For example, the forward electrode 126-1 and the aft electrode 126-2 can be a CSEM source, such as a dipole source. Because the forward electrode 126-1 and the aft electrode 126-2 can be maintained at a relatively fixed distance apart, the forward electrode 126-1 and the aft electrode 126-2 can be a horizontal dipole source.

FIG. 1 shows an example of a marine survey vessel 118 equipped to carry out CSEM surveys. Although not specifically illustrated, the marine survey vessel 118 can be configured to perform both CSEM surveys and marine seismic surveys. The marine survey vessel 118 can tow one or more streamers 120 (shown as one streamer for ease of illustration) below the water surface 109. The streamers 120 can be long cables containing power and data-transmission lines, such as electrical, optical fiber, etc., to which EM receivers 122 may be coupled. In a CSEM survey, the streamers 120 can make use of EM receivers 122, which detect changes in EM energy within the water volume 108. In marine seismic surveys, the streamers 120 can make use of seismic receivers that include a motion sensor, such as a geophone sensor, that detects particle displacement within the water volume 108 by detecting particle motion variation, such as velocities or accelerations, and a hydrophone that detects variations in pressure. In another type of marine survey, such as three-dimensional (3D) EM surveys, receivers on one or more streamers 120 can include EM receivers and seismic receivers such that the streamers 120 can be used to detect both changes in EM energy and seismic energy.

Although not illustrated in FIG. 1, the marine survey vessel 118 can tow marine seismic survey equipment concurrently with the CSEM source 127. The marine seismic survey equipment can include, but is not limited to, seismic sources and streamers, such as the streamer 120. A seismic source can emit an expanding, spherical acoustic signal, which can be analogized to semicircles of increasing radius centered at the seismic source, representing a down-going wavefield, following an acoustic signal emitted by the seismic source. The outward and downward expanding down-going wavefield may eventually reach a solid surface, such as the seafloor, at which point the outward and downward expanding down-going wavefield may partially scatter, may partially reflect back toward the streamer, and may partially refract downward into a solid volume, such as the subsurface, becoming elastic acoustic signals within the solid volume. In contrast, an EM signal is diffusive in nature. The EM field is described by the diffusion limit of Maxwell's equations.

CSEM sources 127 and/or streamers 120 may also be towed by other vessels or may be otherwise disposed in water volume 108. For example, EM receivers may be located on ocean bottom cables or nodes fixed at or near the water bottom, and CSEM sources 127 may also be disposed in a nearly-fixed or fixed configuration. For the sake of efficiency, illustrations and descriptions herein show EM receivers 122 located on streamers 120, but it should be understood that references to EM receivers located on a "streamer" or "cable" should be read to refer equally to marine survey receivers located on a towed streamer, an ocean bottom receiver cable, and/or an array of nodes.

The streamers 120 and the marine survey vessel 118 can include sensing electronics and data-processing facilities that allow receiver readings to be correlated with absolute positions on the sea surface and absolute 3D positions with respect to a 3D coordinate system. In FIG. 1, the EM receivers 122 along the streamer 120 are shown to lie below the sea surface 109, with the receiver positions correlated with overlying surface positions, such as a position 123 near the water surface 109 correlated with the position of receiver 122. Although not specifically illustrated, for some surveys, the streamers 120 can be towed by one vessel, such as the marine survey vessel 118, and the CSEM source 127 can be towed by a different vessel.

A controller 128 can be onboard the marine survey vessel 118. The controller 128 can be coupled to the CSEM source 127. The controller 128 can include processing resources and memory resources and be configured to operate the CSEM source 127. The controller 128 can be coupled to the streamer 120. The controller 128 can be configured to receive data from the EM receivers 122 associated with the streamer 120. In at least one embodiment, the controller 128 can be configured to perform an inversion of enhanced-sensitivity CSEM data as described in more detail herein. For example, processing and analysis of CSEM data from injecting the electric current can be performed in order to help characterize the resistivity structures and distributions of features and materials underlying the surface of the earth. Geological models, such as subsurface resistivity models, can be used to model the EM fields resulting from the current injected from the CSEM source 127 above the subsurface that does or does not contain hydrocarbons. By comparing CSEM data from a CSEM survey using the CSEM source 127 to the geological models, a likelihood of hydrocarbons being located in the surveyed subsurface can be determined.

The CSEM 127 can be used with various frequencies (for example, from 0.1 hertz (Hz) to 100 Hz) of switched DC power. Low frequencies can promote penetration of an EM field resulting from the electric current into the water volume 108; however, the resolution of the CSEM data may be low. In contrast, high frequencies can yield high resolution CSEM data, but the EM field may not penetrate the subsurface as much as the low frequencies. It is beneficial to use a wide frequency band to get a combination of deep penetration into the subsurface and good resolution of the CSEM data.

FIG. 1 shows energy flux 112 and 116 (displayed as arrows) resulting from the electric current injected by the CSEM source 127 and a subsurface resistivity profile 110 from an inversion (indicated by the shading). A change in the resistivity profile may indicate a change in the geology of the subsurface. For example, the darker shading 114 surrounded by lighter shading may be indicative of hydrocarbons in the subsurface. Inversion means reversing a known physical relation in order to infer physical properties from measured data. For example, an inversion compares modeled data to measured data and iteratively minimizes the difference there between. In the case of CSEM surveys, it is the subsurface resistivities that are inverted for using CSEM data received at different positions and offsets from the CSEM source 127. The subsurface resistivity cannot be directly measured using this technique, which is why an inversion is used. To accurately identify variations in the subsurface resistivity (possibly indicating a hydrocarbon saturated volume), large CSEM acquisition areas can be explored. In at least one embodiment, a plurality ("cluster") of nodes can be used to handle large-scale inversion of the order of 10 million unknowns. For instance, CSEM data inversions and other computations can be distributed over the plurality nodes and processes to reduce memory consumption on each node, as well as computational time. Distributing includes spreading over the plurality of nodes. Distribution may be even or uneven over the plurality of nodes. This can allow for analysis of large CSEM acquisition areas by improving performance, including efficiency, of nodes used for associated computations.

Figure 2:
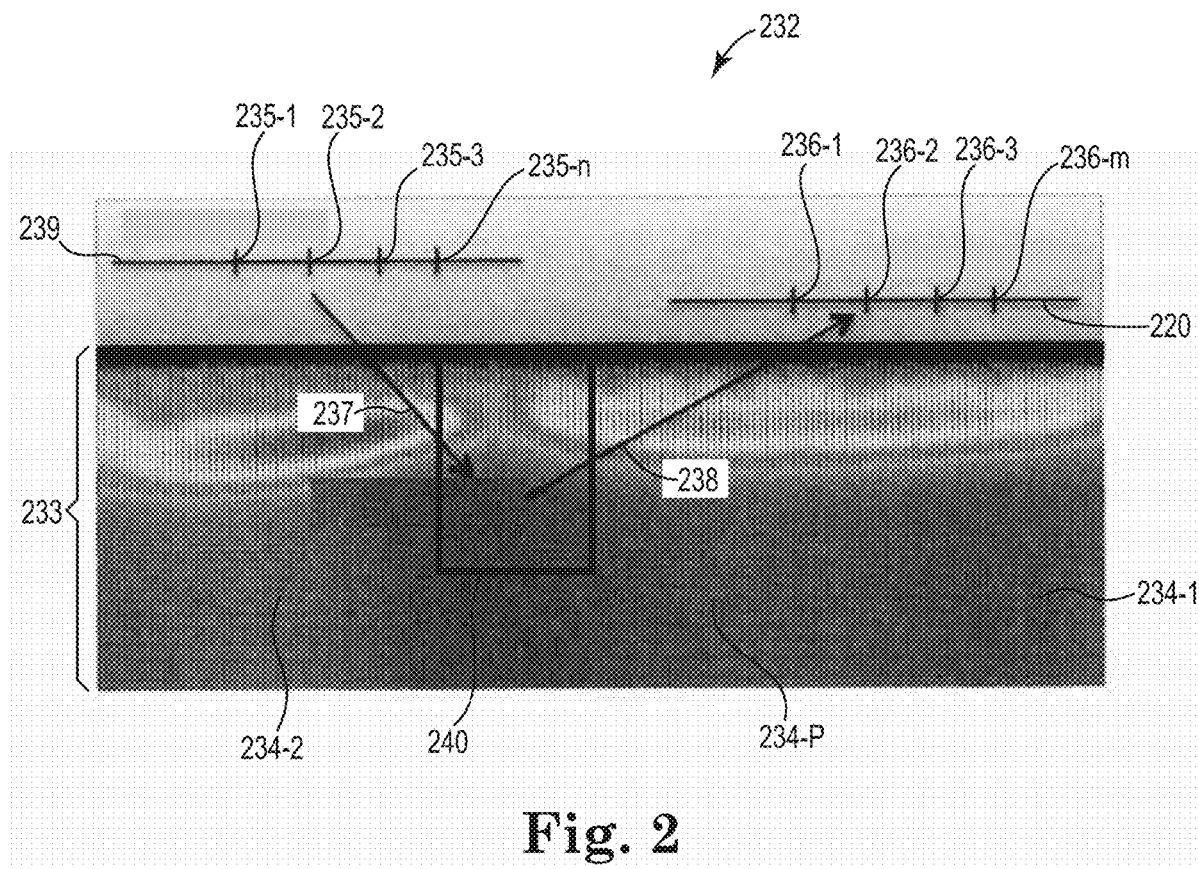
FIG. 2 illustrates a cross-section of a marine surveying environment including an inversion grid comprising a plurality of electrical resistivity data cells according to an embodiment.

FIG. 2 illustrates a cross-section of a marine surveying environment 232 including an inversion grid 233 comprising a plurality of electrical resistivity data cells 234 according to an embodiment. Electrical resistivity data cells 234 can be EM or CSEM electrical resistivity data cells depending on the type of survey performed. Environment 232 can include a marine survey vessel towing a source having a plurality of positions 235-1, 235-2, . . . , 235-n along a source line 239 available for source actuations. As used herein, a source line includes a particular number of source actuations. The positions 235-1, 235-2, . . . , 235-n include physical positions of sources such as air guns, or locations where a physical source has passed and actuated. Streamer 220 is towed behind the marine survey vessel or other vessel and can include receiver locations 236-1, 236-2, . . . , 236-m where reflections can be detected. In at least one embodiment, the streamer 220 can be towed deeper than the source line 239, for instance 10 meters below the source line 239.

Inversion grid 233 is located below a source location 235 and includes electrical resistivity data cells 234. In an example of a large-scale inversion, each source location 235 can include millions of electrical resistivity data cells 234. An electric field of each of the electrical resistivity data cells 234 for each source location 235 is calculated as part of EM data inversion. Calculating each of those electric fields, which include a region around an object within which a force would be exerted on other objects, can be time-consuming and memory-consuming. In at least one embodiment of the present disclosure, an electric field of a predetermined sensitivity area 240 around a source location 235 is determined thus reducing time and memory demands. The size of the predetermined sensitivity area can be determined from decay calculations or from trials to determine a predetermined sensitivity area size that gives most accurate results. For instance, for each source location, the electric field electrical resistivity data cells in an inversion grid that are within a defined distance from the source are determined. The area of this defined distance is the predetermined sensitivity area. For example, if the inversion grid is 100 km×100 km, and the source signal is attenuating to non-measurable levels in about 4 km, there is no need to try to determine the field in all electrical resistivity data cells, so the predetermined sensitivity area is used, which is an area around each source position where electrical fields are determined.

In at least one embodiment, an area such as inversion grid 233 may be reduced from 100 km×100 km to an area the size of predetermined area 240, for instance, 4 km×4 km for each source location, which can reduce a memory and time demand on a system. Arrow 237 represents a path of a wavefield as it travels from a source position 235 towards 234, and arrow 238 represents a resulting reflection received at a receiver 236. As used herein, an electrical resistivity data cell is a block of EM data within a larger subsurface volume of EM data. In at least one embodiment, electrical resistivity data cells decrease in thickness as they approach the seafloor.

Figure 3:
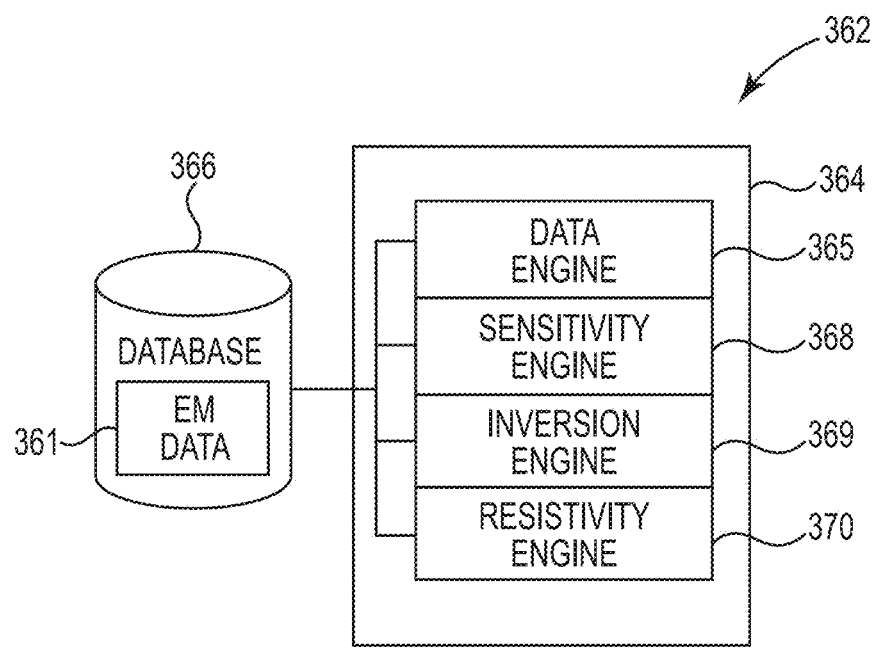
FIG. 3 illustrates a diagram of a system for EM data inversion according to an embodiment.

FIG. 3 illustrates a diagram of a system 362 for EM data inversion according to an embodiment. The system 362 can include a database 366, a subsystem 364, and/or a number of engines, such as a data engine 365, a sensitivity engine 368, an inversion engine 369, and a resistivity engine 370. The subsystem 364 can be analogous to the controller 128 illustrated in FIG. 1 in at least one embodiment. The subsystem 364 and engines can be in communication with the database 366 via a communication link. The database can store EM data 361. The EM data 361 can include CSEM data or other EM data. The EM data 361 can be a result of measurements, estimations, or other marine EM data collection activities.

The system 362 can include more or fewer engines than illustrated to perform the various functions described herein. The system can represent program instructions and/or hardware of a machine such as the machine 474 referenced in FIG. 4, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The data engine 365 can include a combination of hardware and program instructions that is configured to receive EM data such as 3D CSEM data acquired during towed streamer acquisition. The EM data can be indicative of a subterranean formation. In at least one embodiment, the EM data can be 3D CSEM data. For instance, 3D CSEM data can include data acquired during a 3D CSEM marine survey.

The sensitivity engine 368 can include a combination of hardware and program instructions that is configured to determine an electric field within a predetermined sensitivity area around each of a plurality of source positions associated with the towed streamer acquisition. For instance, because an area of EM data or electric field to be inverted may demand calculations incompatible with Gauss-Newton or conjugate gradient algorithms due to the size of the memory or computational time associated with performing the inversion, in at least one embodiment, computations associated with the inversion are split into portions demanding inversion memory amounts below a threshold, and each of the portions can be distributed to a different node within the plurality of nodes for inversion. Each different node has memory available above the threshold. The inversion engine 369 can include a combination of hardware and program instructions that is configured to iteratively invert the electric field using a plurality of nodes of the system until a convergence criterion is met. For instance, Gauss-Newton inversion iterations includes calculating electric field components, $E_{k(ijl)}^x, E_{k(ijl)}^y, E_{k(ijl)}^z$, at each electrical resistivity data cell (such as cells 234 illustrated in FIG. 2) within a sensitivity area for each actuation point, $d-F_k$, wherein d is a measured electric field, and a root mean square (RMS) misfit value of objective function:

$$P(m)=\|W_d(E(m)-d)\|_{l_2}^2+\alpha R(m),$$

where $m=[\log_{10}(\sigma_1), \ldots, \log_{10}(\sigma_N)]$, which is a logarithm of electrical resistivity data cell conductivities. E(m) is a modelled electric field, d is a measured electric field, R(m) is a regularization functional, $\alpha$ is a regularization parameter, k(i,j,l) is a cell index in the I, j, and l direction in a block volume, and $W_d$ is a data weight matrix.

The objective function can be minimized by using an iterative Gauss-Newton algorithm. A resulting linear system of equations for an update of an unknown conductivity vector $m_k$ in iteration k+1 can be derived to:

$$(\alpha_k A+S^T(m_k)S(m_k))\Delta m_k=S_k^T W_d(d-E_k(m_k))-\alpha_k A m_k,$$

where $m_{k+1}=m_k+\Delta m_k$, A is a corresponding regularization matrix, $S(m_k)=W_d J(m_k)$, and $J(m_k)$ is a Jacobian matrix.

In at least one embodiment, the inversion is an iterative process. For instance, conductivity vector m is defining the model and produces an image of the subsurface. In each portion of the inversion process, the model m changes to something that is more consistent with data measured at sea. The iteration portions above are labeled "k". Thus $m_k$, with k=1 is the starting point in the inversion. The $\Delta m_k$ is calculated by solving the linear system of equations that hides in this mathematical expression. To do this, the system is distributed over several nodes, as discussed further herein.

Gauss-Newton inversion iterations also includes calculating electric field components, $E_{k(ijp)}^x, E_{k(ijp)}^y, E_{k(ijp)}^z$, at each electrical resistivity data cell (such as cells 234 illustrated in FIG. 2) within a sensitivity area for each receiver and horizontal and vertical conductivity components of a Jacobian matrix. Those components can be calculated according to:

$$J_{k,(iplj,h)}=E_{k(ijl)}^x E_{k(ijp)}^x+E_{k(ijl)}^y E_{k(ijp)}^y, J_{k,(iplj,v)}=E_{k(ijl)}^z E_{k(ijp)}^z$$

where J is a Jacobian matrix, k is an iteration index, j is a cell point index, (ipl) are data indices where i is a frequency index, p is a receiver index, and l is a source point index. a=h can be a horizontal conductivity or a=v can be a vertical conductivity.

In at least one embodiment, system 362 can include a matrix engine (not illustrated) that can include a combination of hardware and program instructions that is configured to generate the Jacobian matrix and a linear system of equations responsive to the iterative inversion. As used herein, a Jacobian matrix (as illustrated above) is a matrix of first-order partial derivatives of a vector-valued function. By calculating an electric field within a predetermined sensitivity area around each source position associated with the EM data, a Jacobian matrix with a reduced number of non-zero elements is created. For instance, in at least one embodiment, zeros are introduced in the Jacobian matrix and excluded in a matrix-vector calculation using a sparse matrix-vector multiplication scheme. This process can be distributed over a plurality of nodes to reduce communication, computational memory, and time demanded for inversion.

In at least one embodiment, the inversion engine 369 splits and distributes portions of the iterative inversion among a plurality of nodes. For instance, the iterative inversion is split into portions demanding memory amounts below a threshold and each of the portions are distributed to a different node within the plurality of nodes for inversion. This allows for computations to occur in smaller sizes at different nodes, reducing demands for memory and computation time. Each node can handle a threshold memory amount, which may be the same or different, and each portion does not exceed its associated node's threshold memory amount. The threshold memory amount is a particular amount of memory (in gigabytes, terabytes, etc.) available to the node.

Gauss-Newton inversion iterations also include building and solving the aforementioned linear system of equations for $\Delta m_k$, wherein the linear system of equations to solve can include:

$$(\alpha_k R+S_k^T S_k)\Delta m_k=S_k^T W_d(d-F_k)-\alpha_k R m_k,$$

where R is a regularization function, $\alpha$ is a regularization parameter, S is a Jacobian matrix, and $W_d$ is a data weight matrix. The iterations continue until a convergence criterion is met. For instance, the convergence criterion can include a change in an objective function associated with the Gauss-Newton inversion algorithm falling below a threshold. For instance, should the change fall below 0.01, the iterations cease. In at least one embodiment, the convergence criterion includes a change in a conductivity vector associated with the Gauss-Newton inversion algorithm falling below a threshold. For instance, should $\|\Delta m_k\|<0.01\|\Delta m_k\|$, the iterations cease.

In at least one embodiment with respect to the Gauss-Newton inversion iterations, data is arranged in such a way that each node already had the information needed to calculate the parts of the equation that had been split and provided to it. For instance, each node calculates parts of the electric fields and parts of the Jacobian matrix, and then is provided a part of the equation that needed those parts resulting in a lower demand for communication.

In at least one embodiment, system 362 can include a build engine (not illustrated) that can include a combination of hardware and program instructions that is configured to build a plurality of files for use during the inversion. The plurality of files include constant data within an iterative Gauss-Newton algorithm used for the iterative inversion. For example, the plurality of files can include interpolation tables including source to receiver interpolation tables, source to electrical resistivity data cell interpolation tables, electrical resistivity data cell to receiver interpolation tables, receivers to electrical resistivity data cell interpolation tables, and electrical resistivity data cell to electrical resistivity data cell interpolation tables.

In some examples, a conjugate gradient algorithm is used for iterative inversions in place of a Gauss-Newton inversion algorithm. A conjugate gradient algorithm includes an algorithm for a numerical solution of particular systems of linear equations whose matrix is symmetric and positive-definite. For instance, in such an example, the Jacobian matrix can be divided into P sets of rows, which can be distributed to P nodes. In such an example, if the Jacobian matrix has M rows, M/P rows of the Jacobian matrix can be assembled and multiplied by a solution vector in each iteration of the conjugate gradient algorithm. This can reduce a required memory per node and a computation time for inversion.

The resistivity engine 370 can include a combination of hardware and program instructions that is configured to determine a seafloor resistivity based on the iteratively inverted electrical field and the iteratively solved linear system of equations. For instance, a result of an inversion is a seafloor resistivity, which provides information about a subterranean formation. Seafloor resistivity includes a quantification of how strongly the seafloor or the subterranean formations of the region opposes the flow of electric current. For instance, regions of high resistivity may indicate a presence of hydrocarbons. Hydrocarbon-filled reservoirs may have a higher seafloor resistivity as compared to surrounding regions without hydrocarbons.

Figure 4:
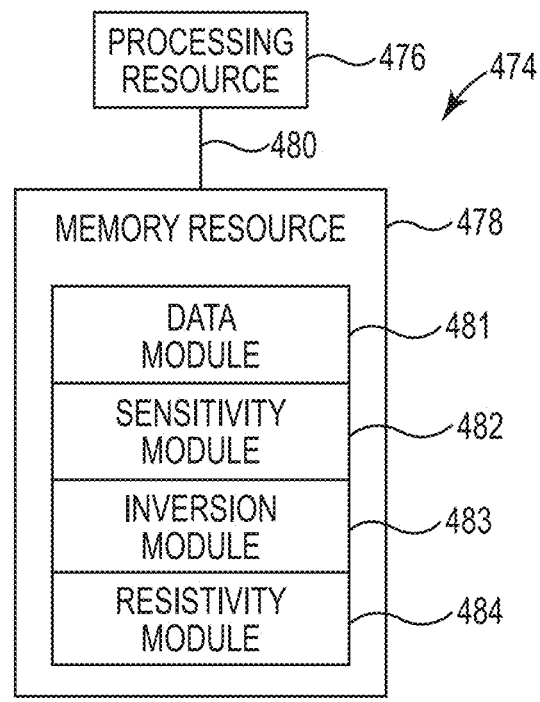
FIG. 4 illustrates a diagram of a machine for EM data inversion according to an embodiment.

FIG. 4 illustrates a diagram of a machine 474 for EM data inversion according to an embodiment. The machine 474 can utilize software, hardware, firmware, and/or logic to perform a number of functions. The machine 474 can be a combination of hardware and program instructions configured to perform a number of functions and/or actions. The hardware, for example, can include a number of processing resources 476 and a number of memory resources 478, such as a machine-readable medium or other non-transitory memory resources 478. The memory resources 478 can be internal and/or external to the machine 474, for example, the machine 474 can include internal memory resources and have access to external memory resources. The program instructions, such as machine-readable instructions, can include instructions stored on the machine-readable medium to implement a particular function. The set of machine-readable instructions can be executable by one or more of the processing resources 476. The memory resources 478 can be coupled to the machine 474 in a wired and/or wireless manner. For example, the memory resources 478 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

Memory resources 478 can be non-transitory and can include volatile and/or non-volatile memory. Volatile memory can include memory that depends upon power to store data, such as various types of dynamic random-access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources 476 can be coupled to the memory resources 478 via a communication path 480. The communication path 480 can be local or remote to the machine 474. Examples of a local communication path 480 can include an electronic bus internal to a machine, where the memory resources 478 are in communication with the processing resources 476 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 480 can be such that the memory resources 478 are remote from the processing resources 476, such as in a network connection between the memory resources 478 and the processing resources 476. That is, the communication path 480 can be a network connection. Examples of such a network connection can include a local area network, wide area network, personal area network, and the Internet, among others.

As shown in FIG. 4, the machine-readable instructions stored in the memory resource 478 can be segmented into a number of modules 481, 482, 483, and 484 that when executed by the processing resource 476 can perform a number of functions. As used herein a module includes a set of instructions included to perform a particular task or action. The number of modules 481, 482, 483, and 484 can be sub-modules of other modules. For example, the data module 481, sensitivity module 482, and inversion module 483, can be sub-modules of the resistivity module 484. Furthermore, the number of modules 481, 482, 483, and 484 can comprise individual modules separate and distinct from one another. Examples are not limited to the specific modules 481, 482, 483, and 484 illustrated in FIG. 4.

Each of the number of modules 481, 482, 483, and 484 can include program instructions and/or a combination of hardware and program instructions that, when executed by a processing resource 476, can function as a corresponding engine as described with respect to FIG. 3. For example, the data module 481 can include program instructions and/or a combination of hardware and program instructions that, when executed by a processing resource 476, can function as the data engine 365, the sensitivity module 482 can include program instructions and/or a combination of hardware and program instructions that, when executed by a processing resource 476, can function as the sensitivity engine 368, the inversion module 483 can include program instructions and/or a combination of hardware and program instructions that, when executed by a processing resource 476, can function as the inversion engine 369, and the resistivity module 484 can include program instructions and/or a combination of hardware and program instructions that, when executed by a processing resource 476, can function as the resistivity engine 370.

In at least one embodiment, the sensitivity module 482 can include instructions executed by processing resource 476 to build an inversion grid of a predetermined size surrounding a source and comprising a plurality of CSEM electrical resistivity data cells. For instance, the inversion grid of the predetermined size can be analogous to predetermined sensitivity area 240 illustrated in FIG. 2. For instance, below a source position may be an inversion grid of ten million electrical resistivity data cells. In order to invert the data, an electric field for each of the ten million electrical resistivity data cells is determined. However, that many determinations can demand an inefficient or unattainable amount of memory or computing time. By calculating the electric field within the predetermined-size inversion grid, and using those results as an overall result, memory and computing time demands are reduced.

Data module 481 can include instructions executable to determine an electric field for each of the plurality of CSEM electrical resistivity data cells, and inversion module 483 can include instructions executable to iteratively invert each of the electric fields using a Gauss-Newton inversion algorithm and generate a linear system of equations comprising a Jacobian matrix based on the plurality of determined electric fields and the iterative inversion. In at least one embodiment, the electric field determination and the Jacobian matrix generation can be performed iteratively as part of, or in addition to, an overall iterative inversion. In at least one embodiment, inversion module 483 iteratively solves the linear system of equations until a convergence criterion is met using the plurality of nodes.

In at least one embodiment, portions of the iterative inversion and solving of the linear system of equations can be assigned to different nodes, where computations can occur. For instance, performance of a portion of the solving of the linear system of equations is distributed across the plurality of nodes, and results are combined in a subsequent iteration. These split (and later re-combination) computations demand less memory and less computation time than performing a computation on a Jacobian matrix as a whole, for example.

In at least one embodiment, the convergence criterion includes a change in an objective function associated with the Gauss-Newton inversion algorithm falling below a threshold, and in another embodiment, the conversion criterion includes a change in a conductivity vector associated with the Gauss-Newton inversion algorithm falling below a threshold. For instance, upon completion of the plurality of iterative inversions, the results are combined, and in at least one embodiment, resistivity module 484 can include instructions executable to determine a seafloor resistivity associated with the CSEM electrical resistivity data cells based on the combined results. For instance, results of the iterative inverting and the iterative solving are combined to determine the seafloor resistivity. The seafloor resistivity is indicative of a subterranean formation such that it indicates the presence of hydrocarbons or other minerals on the seafloor.

Figure 5:
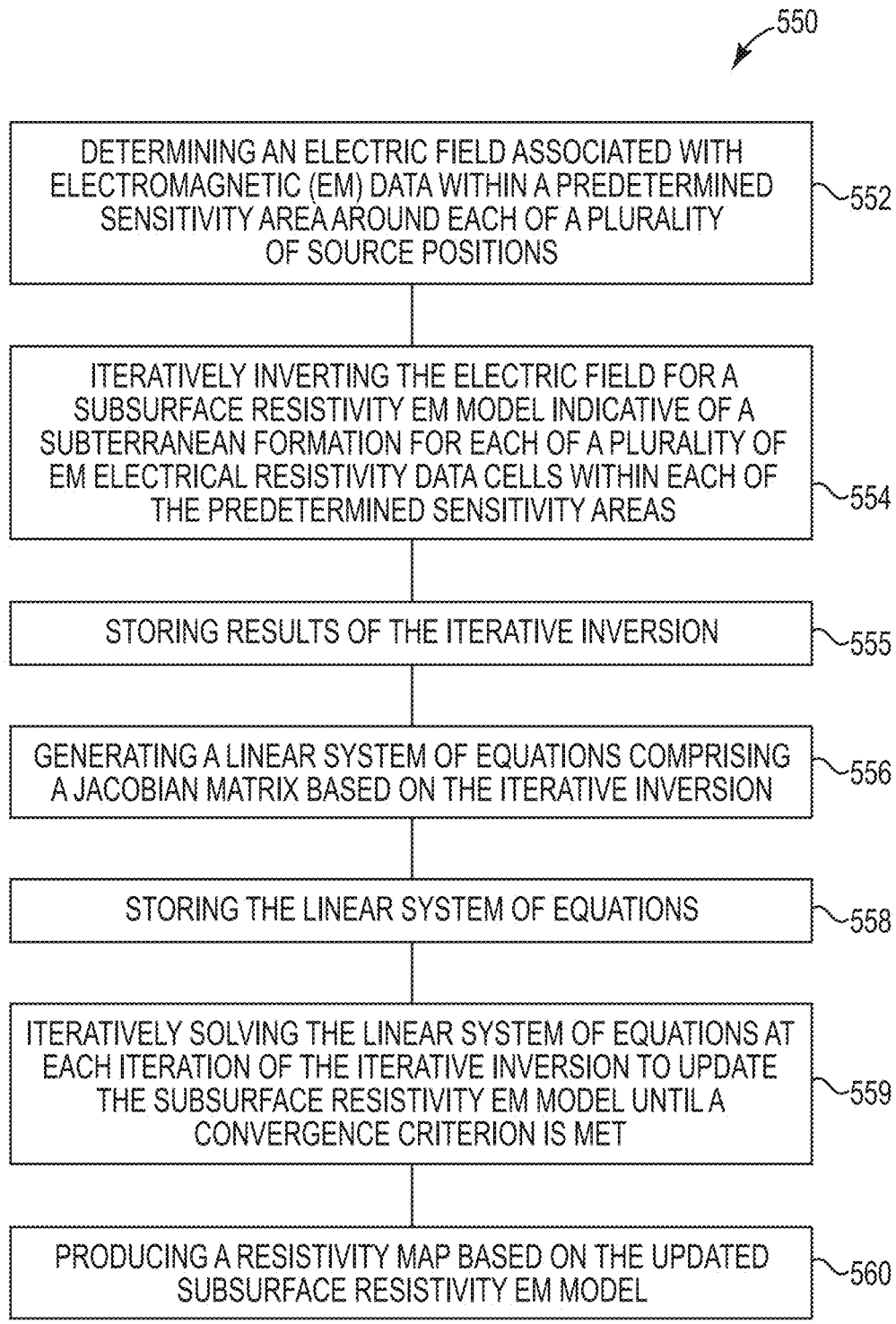
FIG. 5 illustrates a method flow diagram for EM data inversion according to an embodiment.

FIG. 5 illustrates a method flow diagram of a method 550 for EM data inversion according to an embodiment. In at least one embodiment, method 550 can be performed by a machine, such as machine 474 illustrated in FIG. 4. At 552, method 550 can include determining an electric field associated with EM data within a predetermined sensitivity area around each of a plurality of source positions. The EM data, in at least one embodiment, is collected using a plurality of sources and receivers during an EM survey such as towed streamer acquisition. An electric field is determined for each electrical resistivity data cell within each of the predetermined sensitivity areas associated with each of the plurality of source positions. An example predetermined sensitivity area is area 240 illustrated in FIG. 2. The predetermined sensitivity area, in at least one embodiment, is a predetermined moving source-receiver sensitivity area around each of the plurality of source positions. As used herein, a moving source-receiver sensitivity area includes a predetermined sensitivity area that is determined based on moving sources and moving receivers. The EM data associated with each of the plurality of electrical resistivity data cells can include EM data or CSEM data. In at least one embodiment, the EM data can be acquired during towed streamer acquisition.

At 554, method 550 includes iteratively inverting the electric field for a subsurface resistivity EM model indicative of a subterranean formation for each of a plurality of EM electrical resistivity data cells within each of the predetermined sensitivity areas. The subsurface resistivity EM model is a geological model indicative of resistivity associated with the subterranean formation. The inversion, in at least one embodiment is performed using a Gauss-Newton inversion algorithm, and in at least one embodiment, performance of portions of the iterative inversion is distributed over a plurality of nodes. For instance, distributing the performance over a plurality of nodes reduce required memory amounts and computational time for the iterative inversions. At 555, method 550 includes storing results of the iterative inversion.

At 556, method 550 includes generating a linear system of equations comprising a Jacobian matrix based on the iterative inversion. At 558, the linear system of equations is stored, and at 559, method 550 includes iteratively solving the linear system of equations at each iteration of the iterative inversion to update the subsurface resistivity EM model until a convergence criterion is met. The linear system of equations and the results of the iterative inversion are stored, for instance, in a data store as described with respect to FIG. 3 and can be stored, along with the EM data, onshore or offshore. At 560, method 550 can include producing a resistivity map based on the updated subsurface resistivity EM model. For instance, the produced resistivity map may be used for determining the presence of hydrocarbons in a location associated with the resistivity map. In at least one embodiment, based on the resistivity map, the updated subsurface resistivity EM model, or both, expected hydrocarbon locations can be determined.

In at least one embodiment, portions of performance of the iterative solving are distributed over a plurality of nodes. For instance, distributing Jacobian matrix computations includes splitting computations into a plurality of portions demanding memory amounts below a threshold. For instance, distributing of portions of the performance of the iterative solving reduces a memory load demanded for inversion or solving of a system of linear equations by splitting the calculations into elements and computing those elements on separate nodes running in parallel.

In at least one embodiment, the Jacobian matrix can have a threshold number of non-zero elements. The threshold number of non-zero elements is a number that allows for reduced computation and memory demands, for example. For instance, by calculating electric fields within the predetermined sensitivity area, the number of non-zero elements in the Jacobian matrix can be reduced, and computation and memory demands are reduced as a result. In at least one embodiment, method 550 includes parallelizing the electric field determinations over associated frequencies, sources positions, or both. For instance, a plurality of nodes is used simultaneously and in parallel for determining electric fields with respect to frequency and for determining electric fields with respect to source positions. Such parallelization reduces computation times in at least one embodiment.

The updated subsurface resistivity EM model is better indicative of the subterranean formation as compared to a subsurface resistivity EM model of a previous iteration. For instance, generating an updated subsurface resistivity EM model includes generating a model of a seafloor resistivity associated with the plurality of source positions. Such a model is better indicative of the subterranean formation as compared to the original EM data or an EM model of a previous iteration because it is not based on a basic assumption and hydrocarbon or other mineral information can be determined. For instance, the model can indicate the presence of a hydrocarbon in response to a detection of a seafloor resistivity above a threshold. In at least one embodiment, the updated subsurface resistivity EM model is used to generate an image of a subsurface formation. That image may be better indicative of the subsurface formation than one generated by a non-updated subsurface resistivity EM model, for instance.

In at least one embodiment, the method 550 described with respect to FIG. 5 includes a process for EM data inversion, wherein the method 550 is a specific improvement consisting of one or more of elements 552, 554, 555, 556, 558, 559, and 560. In at least one embodiment, the specific improvement includes distributing portions of an iterative inversion or solving of a linear system of equations to improve performance of a node, including reducing computation times and memory requirements.

In accordance with at least one embodiment of the present disclosure, a geophysical data product may be produced or manufactured. Geophysical data may be obtained and stored on a non-transitory, tangible machine-readable medium. The geophysical data product may be produced by processing the geophysical data offshore or onshore either within the United States or in another country. If the geophysical data product is produced offshore or in another country, it may be imported onshore to a facility in the United States. Processing the geophysical data includes iteratively inverting the electric field for a sub-surface resistivity EM model indicative of a subterranean formation for each of a plurality of EM electrical resistivity data cells within each of the predetermined sensitivity areas, generating a linear system of equations comprising a Jacobian matrix based on the iterative inversion, storing the linear system of equations and iteratively solving the linear system of equations at each iteration of the iterative inversion to update the sub-surface resistivity EM model until a convergence criterion is met.

In at least one embodiment, geophysical data is processed to generate an EM image, and the EM image on one or more non-transitory computer readable media, thereby creating the geophysical data product. In some instances, once onshore in the United States, geophysical analysis may be performed on the geophysical data product. In some instances, geophysical analysis may be performed on the geophysical data product offshore. For example, geophysical data can be obtained.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   determining an electric field associated with electromagnetic (EM) data within a predetermined sensitivity area around each of a plurality of source positions;
   iteratively inverting the electric field for a subsurface resistivity EM model indicative of a subterranean formation for each of a plurality of EM electrical resistivity data cells within each of the predetermined sensitivity areas;
   storing results of the iterative inversion;
   generating a linear system of equations comprising a Jacobian matrix based on the iterative inversion;
   storing the linear system of equations;
   iteratively solving the linear system of equations at each iteration of the iterative inversion to update the subsurface resistivity EM model until a convergence criterion is met,
      wherein performance of portions of the iterative solving is distributed over a plurality of nodes demanding memory amounts below a threshold; and
      wherein the updated subsurface resistivity EM model is better indicative of the subterranean formation as compared to a subsurface resistivity EM model of a previous iteration; and
   producing a resistivity map based on the updated subsurface resistivity EM model.

2. The method of claim 1, further comprising distributing a performance of portions of the iterative inversion over a plurality of nodes.

3. The method of claim 1, wherein generating the linear system of equations comprises generating the Jacobian matrix having a threshold number of non-zero elements.

4. The method of claim 1, further comprising parallelizing the electric field determinations over associated frequencies.

5. The method of claim 1, further comprising parallelizing the electric field determinations over associated source positions.

6. The method of claim 1, further comprising iteratively inverting the electric field using a Gauss-Newton inversion algorithm.

7. The method of claim 1, further comprising determining the electric fields associated with the EM data within a predetermined moving source-receiver sensitivity area around each of the plurality of source positions.

8. The method of claim 1, wherein determining the electric field comprises determining the electric field associated with the EM data acquired during towed streamer acquisition.

9. A system, comprising:
   a data engine to receive electromagnetic (EM) data acquired during towed streamer acquisition;
   a sensitivity engine to determine an electric field within a predetermined sensitivity area around each of a plurality of source positions associated with the towed streamer acquisition;

an inversion engine to:
    iteratively invert the electric field using a plurality of nodes of the system until a convergence criterion is met;
    split the iterative inversion into portions demanding memory amounts below a threshold; and
    distribute each of the portions to a different node within the plurality of nodes for inversion, wherein each different node has memory available above the threshold; and
a resistivity engine to determine a seafloor resistivity based on the iteratively inverted electric field and an iteratively solved linear system of equations.

10. The system of claim 9, wherein the EM data is three-dimensional Controlled Source ElectroMagnetic (CSEM) data.

11. The system of claim 10, further comprising a matrix engine to generate a Jacobian matrix and the linear system of equations responsive to the iterative inversion.

12. The system of claim 10, further comprising a build engine to build a plurality of files for use during the iterative inversion, wherein the plurality of files comprises constant data within an iterative Gauss-Newton algorithm used for the iterative inversion.

13. The system of claim 10, further comprising the inversion engine to iteratively invert the electric field until a convergence criterion is met using a conjugate gradient algorithm.

14. A non-transitory machine-readable medium storing instructions executable by a processing resource to:
    build an inversion grid of a predetermined size surrounding a source and comprising a plurality of controlled source electromagnetic (CSEM) electrical resistivity data cells;
    determine an electric field for each of the plurality of CSEM electrical resistivity data cells;
    iteratively invert, using a plurality of nodes, each of the electric fields using a Gauss-Newton inversion algorithm;
    generate a linear system of equations comprising a Jacobian matrix based on the plurality of determined electric fields and the iterative inversion;
    iteratively solve, using the plurality of nodes, the linear system of equations until a convergence criterion is met;
    combine results of the iterative inverting and the iterative solving; and
    determine a seafloor resistivity associated with the each of the CSEM electrical resistivity data cells based on the combined results.

15. The medium of claim 14, wherein the convergence criterion comprises a change in an objective function associated with the Gauss-Newton inversion algorithm falling below a threshold.

16. The medium of claim 14, wherein the convergence criterion comprises a change in a conductivity vector associated with the Gauss-Newton inversion algorithm falling below a threshold.

17. The medium of claim 14, further comprising instructions executable to iteratively solve the linear system of equations using the plurality of nodes by distributing performance of a portion of the iterative solving across the plurality of nodes and combining results in a subsequent iteration.

18. A method to manufacture a geophysical data product, the method comprising:
    obtaining geophysical data, wherein obtaining the geophysical data comprises:
        determining an electric field associated with electromagnetic (EM) data collected using a plurality of sources and receivers during an EM survey and within a predetermined sensitivity area around each of a plurality of source positions;
    processing the geophysical data, comprising:
        iteratively inverting the electric field for a sub-surface resistivity EM model indicative of a subterranean formation for each of a plurality of EM electrical resistivity data cells within each of the predetermined sensitivity areas;
        generating a linear system of equations comprising a Jacobian matrix based on the iterative inversion;
        storing the linear system of equations; and
        iteratively solving the linear system of equations at each iteration of the iterative inversion to update the sub-surface resistivity EM model until a convergence criterion is met,
            wherein performance of portions of the iterative solving is distributed over a plurality of nodes demanding memory amounts below a threshold; and
            wherein the updated sub-surface resistivity EM model is better indicative of the subterranean formation as compared a sub-surface resistivity EM model of a previous iteration; and
    recording the geophysical data product on one or more non-transitory machine-readable media, thereby creating the geophysical data product.

19. The method of claim 18, wherein processing the geophysical data comprises processing the geophysical data offshore or onshore.

* * * * *